United States Patent [19]

Delmas et al.

[11] Patent Number: 5,260,147
[45] Date of Patent: Nov. 9, 1993

[54] ELECTRODE MATERIAL $Li_xM_{z2-z}O_{5-t}$, PRODUCTION PROCESS AND ITS USE IN AN ELECTROCHEMICAL GENERATOR

[75] Inventors: Claude Delmas, Talence; Alain Levasseur, Gradignan; Michel Menetrier, Bordeaux; Sabine Brethes, D'Ornon, all of France

[73] Assignee: Centre National de la Recherche Scientifique, Paris, France

[21] Appl. No.: 752,566

[22] PCT Filed: Mar. 20, 1990

[86] PCT No.: PCT/FR90/00187

§ 371 Date: Sep. 11, 1991

§ 102(e) Date: Sep. 11, 1991

[87] PCT Pub. No.: WO90/11623

PCT Pub. Date: Oct. 4, 1990

[30] Foreign Application Priority Data

Mar. 21, 1989 [FR] France ............... 89 03682

[51] Int. Cl.$^5$ .................................. H01M 4/36
[52] U.S. Cl. .................................. 429/194; 429/218; 29/623.5
[58] Field of Search ............. 429/218, 194, 197, 196; 252/182.1; 29/623.5

[56] References Cited

U.S. PATENT DOCUMENTS

| | | | |
|---|---|---|---|
| 4,465,747 | 8/1984 | Evans | 429/194 |
| 4,542,083 | 9/1985 | Cava et al. | 429/218 |
| 4,710,439 | 12/1987 | Tarascon | 429/218 X |
| 4,751,157 | 6/1988 | Uchiyama | 429/218 X |
| 4,803,137 | 2/1989 | Miyazaki et al. | 429/194 |
| 5,013,620 | 5/1991 | Miyazaki et al. | 429/194 |
| 5,053,297 | 10/1991 | Yamahira | 429/194 |

FOREIGN PATENT DOCUMENTS

| | | |
|---|---|---|
| 2527842 | 12/1983 | France . |
| 2605458 | 4/1988 | France . |
| 2615657 | 11/1988 | France . |

OTHER PUBLICATIONS

Electrochimica Acta, vol. 28, No. 1, Jan. 1983, Pergamon Press Ltd, N. Kumagai et al.: "Structural changes of $Nb_2O_5$ and $V_2O_5$ as rechargeable cathodes for lithium battery", pp. 17–22.

Proceedings of the Electrochemical Society, vol. 88-6, 1988, M. Sugawara et al.: "Electrochemical behavior of vanadium(V) oxide in propylene carbonate-LiClO$_4$", pp. 503–510.

Journal of Power Sources, vol. 7, No. 2, Jan. 1982, M. Pasquali, et al.: "$(Mo_{0.3}V_{0.7})_2O_5$ as a solid solution cathode for li cells. Part II. Structural characteristics and secondary cells", pp. 145–152.

Chemical Abstracts, vol. 111, No. 14, Oct. 2, 1989, p. 183, resume 118219s, and JP, A, 1137563 (Japan Storage Battery Co.:, Ltd) May 30, 1989.

Journal of Power Sources, vol. 24, No. 2, Sep. 1988, Elsevier Sequoia, A. Tranchant et al.: "A comparitive electrochemical study of $MoO_3$ $V_2O_5$ and $MoV_2O_8$ as rechargeable cathodes in lithium cells", pp. 85–93.

(List continued on next page.)

Primary Examiner—Anthony Skapars
Attorney, Agent, or Firm—Oblon, Spivak, McClelland, Maier & Neustadt

[57] ABSTRACT

The invention relates to an electrode material for a lithium electrochemical generator in accordance with the formula:

$$Li_xM_zV_{2-z}O_{5-t}$$

in which M represents Mo and/or Nb and x, z and t are such that

$0 < x \leq 3.2$ $0 \leq z < 1$ $0 \leq t < 0.5$

The X-ray spectrum of this material is subsequently illustrated.

11 Claims, 5 Drawing Sheets

OTHER PUBLICATIONS

Electrochimica Acta, vol. 33, No. 7, Jul. 1988, Pergamon Press plc., S. Hub et al.: "X-ray investigations on electroformed $Li_xV_2O_5$ bronzes", pp. 997-1002.

Journal of Power Sources, vol. 16, No. 3, Nov. 1985, Elsevier Sequoia, J.-P. Pereira-Ramos et al.: "Sulfone-based electrolytes for lithium intercalation batteries", pp. 193-204.

Journal of Power Sources, vol. 20, 1987, Elsevier Sequoia, K. Wiesener et al.: "Vanadium oxides in electrodes for rechargeable lithium cells", pp. 157-164.

Journal of Power Sources, vol. 20, 1987, Elsevier Sequoia, J.-P. Pereira-Ramos et al.: "Investigation of lithium intercalation materials with organic solvents and molten salts as electrolytes at temperatures between 60° and 175° C.", pp. 221-230.

Journal of the Electrochemical Society, vol. 132, No. 2, Feb. 1985, G. Pistoia et al.: "$Li/Li_{1+x}V_3O_8$ secondary batteries", pp. 281-284.

ELECTRODE MATERIAL $LI_xM_{z2-z}O_{5-t}$, PRODUCTION PROCESS AND ITS USE IN AN ELECTROCHEMICAL GENERATOR

The present invention relates to a novel electrode material for a lithium electrochemical generator. More specifically, it relates to a novel positive electrode material based on vanadium oxide, optionally substituted by another element such as niobium or molybdenum, which also contain lithium.

For several years development has taken place of lithium electrochemical generators due to their very high potential mass energy. These electrochemical generators comprise a positive electrode constituted by a lithium intercalation compound, a liquid or solid electrolyte and a negative electrode constituted by lithium, a lithium alloy or an intercalation compound having a low potential compared with lithium.

Among the presently known reversible systems, considerable research has been carried out on intercalation in $V_2O_5$ and it is known that the first discharge curve of this material has several plateau regions located respectively at approximately 3.4, 3.2 and 2.4 volts with respect to the lithium.

The operating principle of all these systems is based on the retention, during the intercalation of the lithium, of the structural skeleton of the host material used for the intercalation of the lithium. As the network of strong bonds of this reception structure is retained, it is possible for the system to be deintercalated or disintercalated, which leads to the reversibility of the generator.

Numerous authors have studied the performance characteristics of $V_2O_5$ positive electrodes in lithium rechargeable batteries. These studies have led to the following publications: Wiesener et al in Journal of Power Sources, 20, 1987, pp. 157–164; Tranchant et al in Journal of Power Sources, 24, 1988, pp. 85–93, and Pereira-Ramos et al in Journal of Power Sources, 20, 1987, pp. 221–230.

In these publications, it is stated that batteries using such positive electrodes are cyclable when the discharge is limited to a potential so as to include, during the discharge, less than 2.35 lithium atoms per $V_2O_5$ molecule. Therefore the mass capacity of lithium generators using electrodes of this type is limited.

Other authors have also studied the behaviour of $V_2O_5$ electrodes when discharge takes place at lower potentials, as described by N. Kumagai et al in Electrochimica Acta, vol. 28, no. 1, 1983, pp. 17–22, by M. Sugawara et al in Proceedings of the Electrochemical Society, vol. 88-6, 1988, pp. 503–510 and by M. Pasquali et al in Journal of Power Sources, vol. 7, no. 2, 1982, pp. 145–152.

Under the discharge conditions given by these authors, less than 2.5 Li atoms are always included and there is no irreversible structural change leading to an improvement in the properties of the electrode.

The present invention specifically relates to a novel electrode material for an electrochemical generator of this type, which makes it possible to obtain a mass energy higher than that of $V_2O_5$, a very good reversibility, a fast intercalation or deintercalation kinetics, a very broad range of use because the material is insensitive to supercharging or superdischarging of the generator and reduced costs in obtaining the said material.

According to the invention, this electrode material is in accordance with the formula:

$$Li_xM_zV_{2-z}O_{5-t}$$

in which M represents Mo and/or Nb and x, z and t are such that $$0 < x \leq 3.2$$

$$0 \leq z < 1$$

$$0 \leq t < 0.5$$

and it has an X-ray diffraction spectrum essentially incorporating two lines, which in the particular case $z = t = 0$ are at an angular distance $2\theta$ of approximately 64 and 44° for the wavelength $K\alpha_1$ of copper (1.54 Å), which respectively correspond to interplanar spacings of approximately 2.0 and 1.45 Å.

In this material, M represents one or more elements which can be substituted for vanadium in $V_2O_5$ used as the starting product prior to lithium intercalation. The structural interconnection characteristic of $V_2O_5$ is retained in the substituted phase. Such a substitution has been obtained in the case of molybdenum by L. KIHLBORG (Acta Chemica Scandinavica, vol. 21, p. 2495, 1967). The phase of composition $(Mo_{0.3}V_{0.7})_2O_5$ was obtained. This author notes the structural analogy with the variety R-$Nb_2O_5$, which leads to the assumption of the existence of solid solutions with niobium.

It is also possible to have an oxygen deficit in this material. Thus, vanadium oxide $V_2O_5$ has at elevated temperature the well known oxygen expulsion on solidification phenomenon, which leads to a slight oxygen loss. The invention relates to any oxygen-deficient material retaining the structural interconnection of $V_2O_5$.

The electrode material according to the invention has a structure different from that of $V_2O_{5-t}$ or $M_zV_{2-z}O_{5-t}$. This structure can be obtained by the intercalation in $M_zV_{2-z}O_{5-t}$ of at least 2.5 and e.g. approximately 3 lithium atoms chemically or electrochemically. With this intercalation level, there is an irreversible transformation of the starting material $M_zV_{2-z}O_{5-t}$ and a different structure is obtained, which can be identified with X-rays and which remains stable during subsequent electrochemical cycling operations of the material in an electrochemical generator.

This novel material which can be formed at a low potential can then be electrochemically intercalated or deintercalated within a range of potentials permitted by the electrolytes used in lithium batteries. Therefore the thus formed novel structure is retained during the cycling operations and the novel material has very good electrochemical characteristics. The material can also be used in systems derived from electrochemical generators operating by redox reaction, e.g. in electrochromic systems.

As stated hereinbefore, the material according to the invention can be obtained chemically or electrochemically.

When using the chemical procedure, contacting takes place between a $M_zV_{2-z}O_{5-t}$ powder and an organolithium compound dissolved in an organic solvent, accompanied by stirring for a time such that at least 2.5, preferably 2.8 to 3.2 and e.g. 3 lithium atoms per $M_zV_{2-z}O_{5-t}$ molecule are inserted in the latter.

The organolithium compound can be an alkyl lithium, e.g. butyl lithium and the organic solvent can be hexane. The time necessary for obtaining the intercalation of approximately 3 lithium atoms is generally long and can e.g. vary between 1 and 10 days.

When the material is prepared electrochemically, the starting product is again $M_zV_{2-z}O_{5-t}$ oxide and the latter undergoes lithium electrochemical intercalation by the discharge of an electrochemical cell comprising a positive electrode constituted by said oxide, a lithium-based negative electrode and a lithium ion conducting electrolyte, by carrying out said discharge up to a voltage below 1.9 V compared with the lithium electrode, e.g. at a minimum voltage between 1 and 1.9 V compared with the lithium electrode and under conditions such that at least 2.5 lithium atoms are intercalated per mole of $M_zV_{2-z}O_{5-t}$.

The electrochemical reaction leading to the novel material according to the invention starts to take place at approximately 1.9 V. However, this value can be modulated by the experimental conditions (current density, nature of the electrolyte, texture of the electrode). The minimum value of the voltage is a function of the nature of the electrolyte used (1 V for LiClO$_4$ in pure propylene carbonate or containing DME) and also the experimental conditions.

It is desirable not to cause a decomposition reaction of the electrolyte at low potential, which could be prejudicial to the satisfactory operation of the system without the electrode material being impaired. This minimum voltage value could be lowered when using electrolytes which are more stable at low potential (e.g. polymers or solids).

In order to obtain this intercalation of at least 2.5 lithium atoms, it is important for the construction of the generator (close contact between the active material and the electronic conductor) on the one hand and the discharge conditions (current density) on the other hand to lead to a low polarization system permitting the insertion of at least 2.5 lithium atoms during the discharge up to a voltage below 1.9 V.

Figure 5:
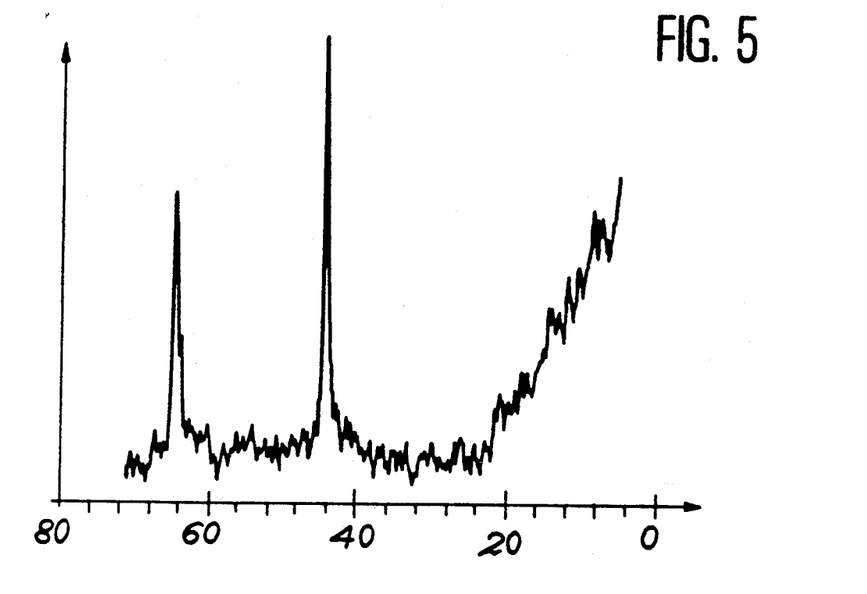
FIG. 5: The X-ray diffraction spectrum of a material according to the invention following the first discharge of the generator carried out with a copper anticathode ($\lambda = 1.54$ Å) and graduated in $2\theta$.

The way in which this first discharge is carried out generally makes it possible to obtain the intercalation of 2.5 to 3.2 lithium atoms and to irreversibly modify the structure of the starting material $M_zV_{2-z}O_{5-t}$, so as in this way to obtain the material characterized by the X-ray diffraction spectrum referred to hereinbefore and shown in the attached FIG. 5, without eliminating the possibility of the electrochemical cycling of this material in a significant potential range compared with that which could be obtained with the prior art generators.

In the articles by Kumagai et al, Sugawara et al and Pasquali et al referred to hereinbefore, no crystalline structure modification was obtained and there was no intercalation of at least 2.5 lithium atoms.

Thus, FIG. 1 of Electrochimica Acta shows that there are still plateau regions during the second discharge and FIG. 6, which is an X-ray diffraction spectrum of the material, indicates that certain lines reappear during recharging, i.e. the material structure is not irreversibly modified into the stable crystalline structure according to the invention.

FIG. 1 of Proceedings of the Electrochemical Society shows that 2.5 lithium atoms are not included during the discharge and the material according to the invention could not have formed. Moreover, the material does not have the crystalline structure according to the invention, because it has become amorphous.

In Journal of Power Sources, 7, 1982, no.2, pp. 145-152, at the most 2 lithium atoms are intercalated in $(Mo_{0.3}V_{0.7})_2O_5$, and this does not cause a significant structural reorganization.

Thus, none of these authors was able to arrive at the electrode material according to the invention, which has improved properties, as will be shown hereinafter.

The invention also relates to an electrochemical generator incorporating a vanadium oxide-based positive electrode, a lithium-based negative electrode and a lithium ion-conducting electrolyte, which is characterized in that the vanadium oxide of the positive electrode is in accordance with the formula:

$$Li_xM_zV_{2-z}O_{5-t}$$

in which M represents Mo and/or Nb and x, z and t are such that $$0 < x \leq 3.2$$

$$0 \leq z < 1$$

$$0 \leq t < 0.5$$

and in that the X-ray spectrum of $Li_xM_zV_{2-z}O_{5-t}$ for the wavelength $K\alpha_1$ of copper (1.54 Å) essentially has two lines at an angular distance $2\theta$ of approximately of 64° and 44°, which respectively correspond, in the particular case $z=t=0$, to interplanar spacings of approximately 2.0 and 1.45 Å.

In this generator, it is possible to use as the lithium-based negative electrode, the electrodes which are generally used, e.g. lithium or lithium alloy electrodes.

The electrolytes used in this generator can be liquid electrolytes, solid electrolytes or lithium-ion conducting polymers.

When use is made of a liquid electrolyte, the latter is constituted by a lithium salt dissolved in an appropriate, generally organic and aprotic solvent, which can be chosen from among straight chain, cyclic ethers and esters, as well as mixtures thereof.

Examples of usable solvents are propylene carbonate, tetrahydrofuran, dioxolan, 1,2-dimethoxyethane and other glymes.

The lithium salt constituting the electrolyte can be chosen from among lithium perchlorate, lithium tetrafluoborate, lithium sulphonate trifluoromethane, lithium hexafluorophosphate, lithium hexafluoroarsenate and mixtures thereof.

When use is made of a solid electrolyte, the latter can be constituted by a lithium glass e.g. obtained from $P_2S_5$, $Li_2S$ and LiI or $B_2S_3$, $Li_2S$ and LiI.

In the case where the electrolyte is constituted by a polymer, it can be a polyethylene oxide filled with a lithium salt such as those described hereinbefore.

The positive electrode of the generator according to the invention incorporates the electrode material according to the invention. In general, in order to prepare said electrode, it is possible to start with a $M_zV_{2-z}O_{5-t}$ powder, to which is added an electronic conductive material such as carbon black, powder or fibres of graphite and/or carbon. This compressed mixture is then electrochemically transformed into the electrode according to the invention. It is also possible to start with a $M_zV_{2-z}O_{5-t}$ powder deposited on a grid or grating of an electronic conductive material, e.g. a Ni grid or grating. In this case, the thus prepared electrode is placed in an electrochemical generator and it is subject to the electrochemical cycling necessary for forming the material according to the invention.

If the material is prepared chemically, the electrode is prepared in the same way, but using the $Li_xM_zV_{2-z}O_{5-t}$ powder obtained chemically in place of the $M_zV_{2-z}O_{5-t}$ powder.

The electrochemical generator according to the invention can be produced in the form of flat or spirally wound thin films incorporating the two electrodes and the electrolyte. It can also be produced from solid electrodes.

Other features and advantages of the invention can be gathered from the following description given in an illustrative and non-limitative manner relative to the attached drawings, wherein show.

EXAMPLE 1

This example involves the preparation of an electrode material according to the invention using the electrochemical method. To this end, 40 mg of a $V_2O_5$ powder are mixed with 10 mg of acetylene black, e.g. the product sold under the trademark Ketjen Black, by intimately grinding the two powders in an agate mortar. This mixture is then used as the positive electrode in the electrochemical generator shown in FIG. 1.

Figure 1:
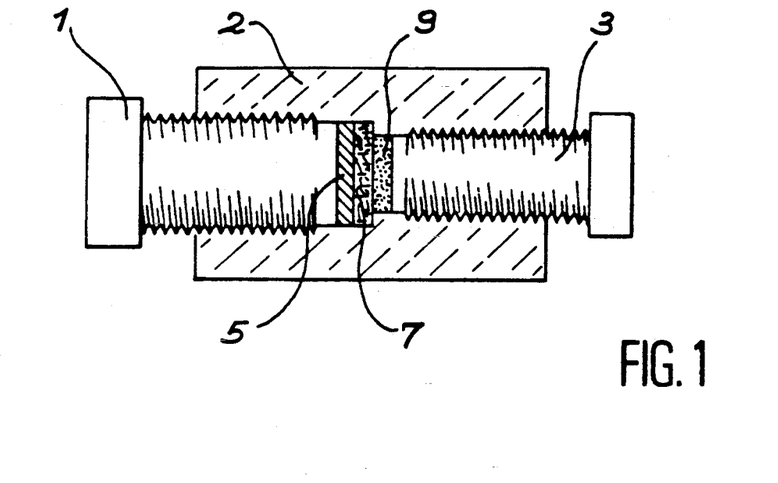
FIG. 1: Diagrammatically and in vertical section a lithium chemical electrochemical generator.

FIG. 1 shows that this generator comprises two metal screws 1, 3 placed in a polytetrafluoroethylene envelope 2, between which are successively arranged a negative electrode 5 constituted by a freshly cut, diameter 14 mm lithium disk, a fibreglass separator 7, a diameter 12 mm positive electrode 9 constituted by the previously obtained powder mixture and an electrolyte impregnating the fibreglass separator 7 and the positive electrode 9.

The electrolyte is constituted by a solution of lithium perchlorate in distilled propylene carbonate, which contains 1 mole (106.4 g) of lithium perchlorate per liter and use is made of 0.2 ml of this electrolyte for impregnating the separator 7 and the positive electrode 9.

These two electrodes and the separator are compressed by the two metal screws 1 and 3, which also serve as current collectors. The voltage of the aforementioned generator is approximately 3.5 V. To transform the positive electrode 9 into the material according to the invention, said electrode is discharged by the passage of a current of 200 $\mu$A until its potential reaches a value of 1.9 V, relative to the lithium.

Figure 2:
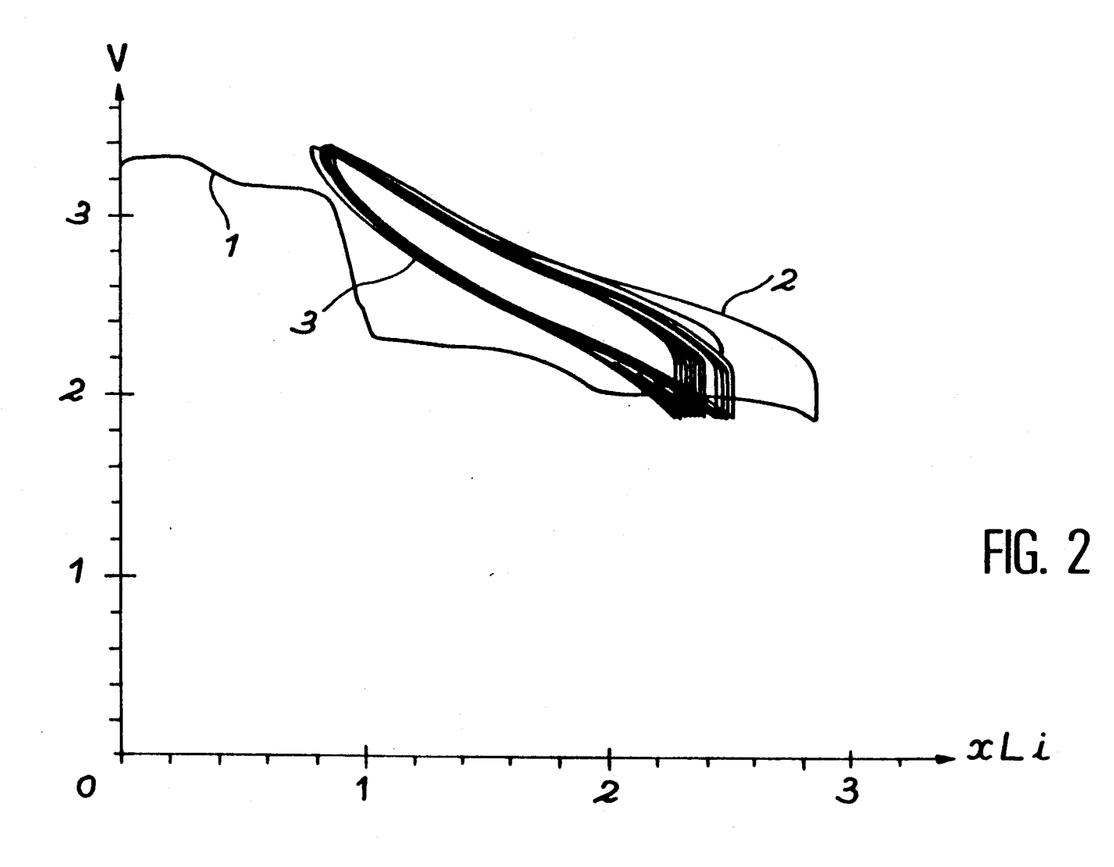
FIG. 2: A graph obtained during electrochemical cycling and the production of an electrode according to the invention, which shows the voltage (in volts) as a function of the number of intercalated lithium atoms (x).

FIG. 2 shows the evolution of the potential (in volts) as a function of the number of lithium atoms (x) intercalated in the $V_2O_5$ positive electrode. In FIG. 2, curve 1 corresponds to the first discharge and it can be seen that the potential decreases from 3.3 to 1.9 V. On reaching 1.9 V approximately 3 lithium atoms have been intercalated and the irreversible structural transformation leading to the material according to the invention has been obtained.

On then recharging the electrode, curve 2 is obtained and it is possible to recharge up to a potential of e.g. approximately 3.4 V. Then, on carrying out electrochemical cycling of the electrode between 3.4 and 1.9 V, the curves 3 are obtained, which no longer have the characteristic plateaux obtained during the initial intercalation in $V_2O_5$ (curve 1). Thus, it is possible to cycle the electrode between 3.4 and 1.9 V having a high lithium intercalation and deintercalation level for each cycle, which leads to a mass energy higher than that of conventional lithium batteries.

Figure 3:
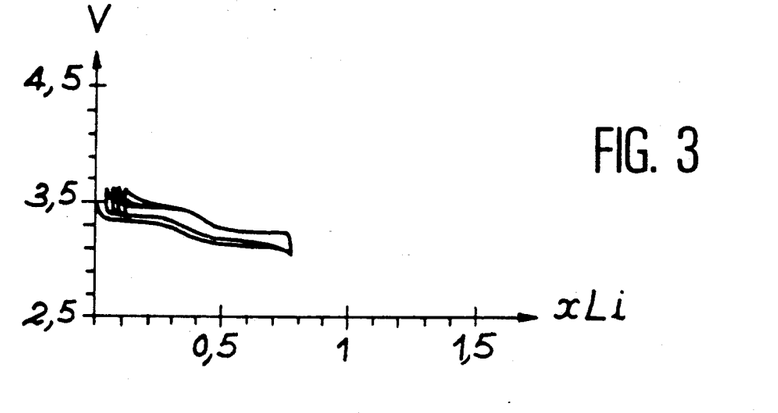
FIGS. 3 and 4: $V_2O_5$ electrode electrochemical cycling diagrams or graphs showing the voltage (in volts) as a function of the number of intercalated lithium atoms (x).
Figure 4:
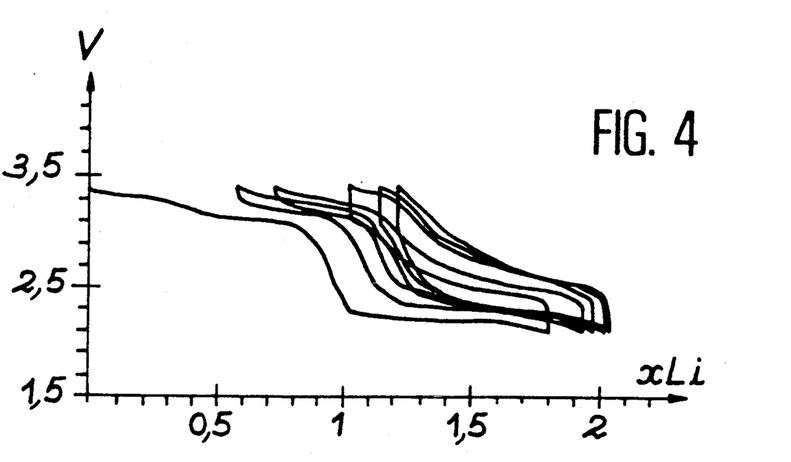

FIGS. 3 and 4 show, for comparison, the electrochemical cycling curves obtained when cycling is carried out of a $V_2O_5$ electrode in accordance with the prior art. FIG. 3, which corresponds to an electrochemical cycling between 3.6 and 3.1 V shows a good reversibility, but a limited lithium intercalation. FIG. 4, which corresponds to electrochemical cycling between 3.4 and 2.1 V, reveals a less satisfactory system reversibility and the curves are displaced during electrochemical cycling operations, but the intercalation level remains low during each cycle.

In Journal of Power Sources, 20, 1987, pp. 157-164, Wiesener et al studied the influence of the discharge of a vanadium oxide electrode on the characteristics of the battery and they illustrated a second discharge carried out up to a potential between 1 and 2 V, but the structural change of the material did not occur in accordance with the present invention, because according to this prior art the material is no longer rechargeable. In the same way, recycling curves according to FIG. 2 are not obtained.

It is assumed that the use of a discharge potential in this range is not an adequate condition for obtaining the irreversible structural modification according to the invention, because the latter must also depend on the texture of the electrode, the current density used during the discharge and possibly the nature of the electrolyte.

The use of excessive current densities during the first discharge can lead to a polarization of the system such that the material transformation process does not take place for kinetic reasons, or resulting from a poor realization of the electrode.

In the invention, for bringing about this transformation use is made of lower current densities, e.g. 0.177 mA/cm$^2$ in place of 1 mA/cm$^2$. The particular structure of the material according to the invention can then be revealed by X-ray diffraction spectrometry.

FIG. 5 shows the X-ray diffraction spectrum (copper anticathode $\lambda = 1.54$ Å) of the electrode 9 following the first discharge of the battery. It can be seen that the spectrum has two main lines with an angular distance $2\theta$ of 64 and 44°, which respectively correspond to interplanar spacings of 2.04±0.5 Å and 1.43±0.5 Å.

Figure 6:
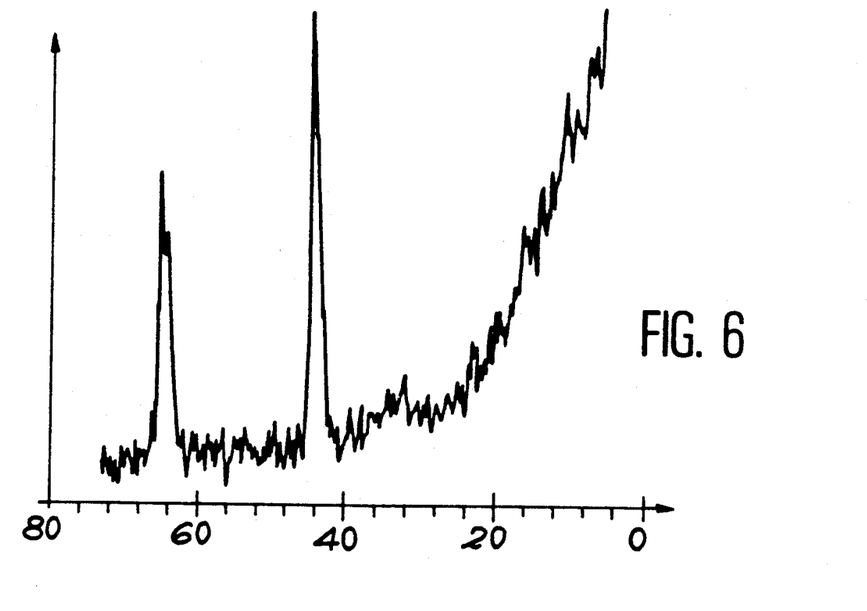
FIG. 6: The X-ray diffraction spectrum of the same material after recharging the generator performed with a copper anticathode ($\lambda = 1.54$ Å) and graduated in $2\theta$.

FIG. 6 shows the X-ray diffraction spectrum of this material after recharging the generator. It can be seen that this spectrum is substantially identical to that of FIG. 5. Thus, the structure of the material is maintained and there are also two wide lines at the same angular distances.

Figure 7:
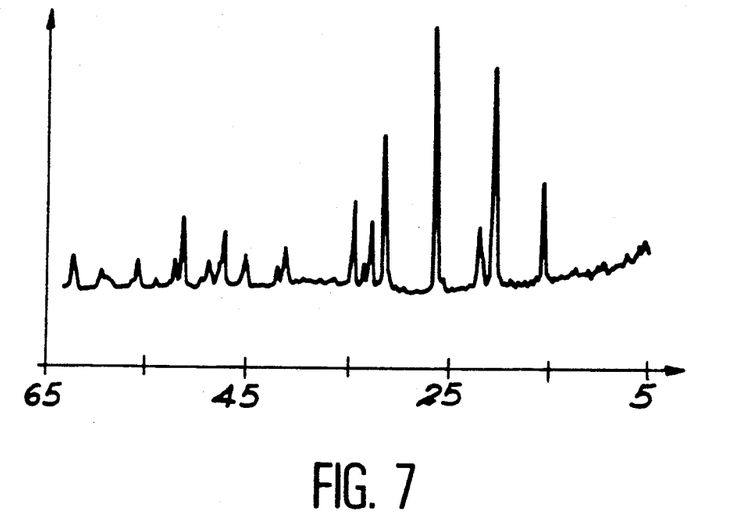
FIG. 7: For comparison, the X-ray diffraction spectrum of $V_2O_5$, produced with a copper anticathode ($\lambda = 1.54$ Å) and graduated in $2\theta$.

For comparison purposes, FIG. 7 shows the X-ray diffraction spectrum of vanadium oxide $V_2O_5$. The configuration thereof is completely different and does not have the two lines characteristic of the material according to the invention.

EXAMPLE 2

The same operating procedure as in example 1 is followed for preparing an electrode material according to the invention, except that the electrolyte solvent is constituted by a 50:50 volume mixture of propylene carbonate and 1,2-dimethoxyethane. There is also a modification to the upper and lower voltage limits used for cycling and are in this case upper limit 4 V and lower limit 1 V.

Figure 8:
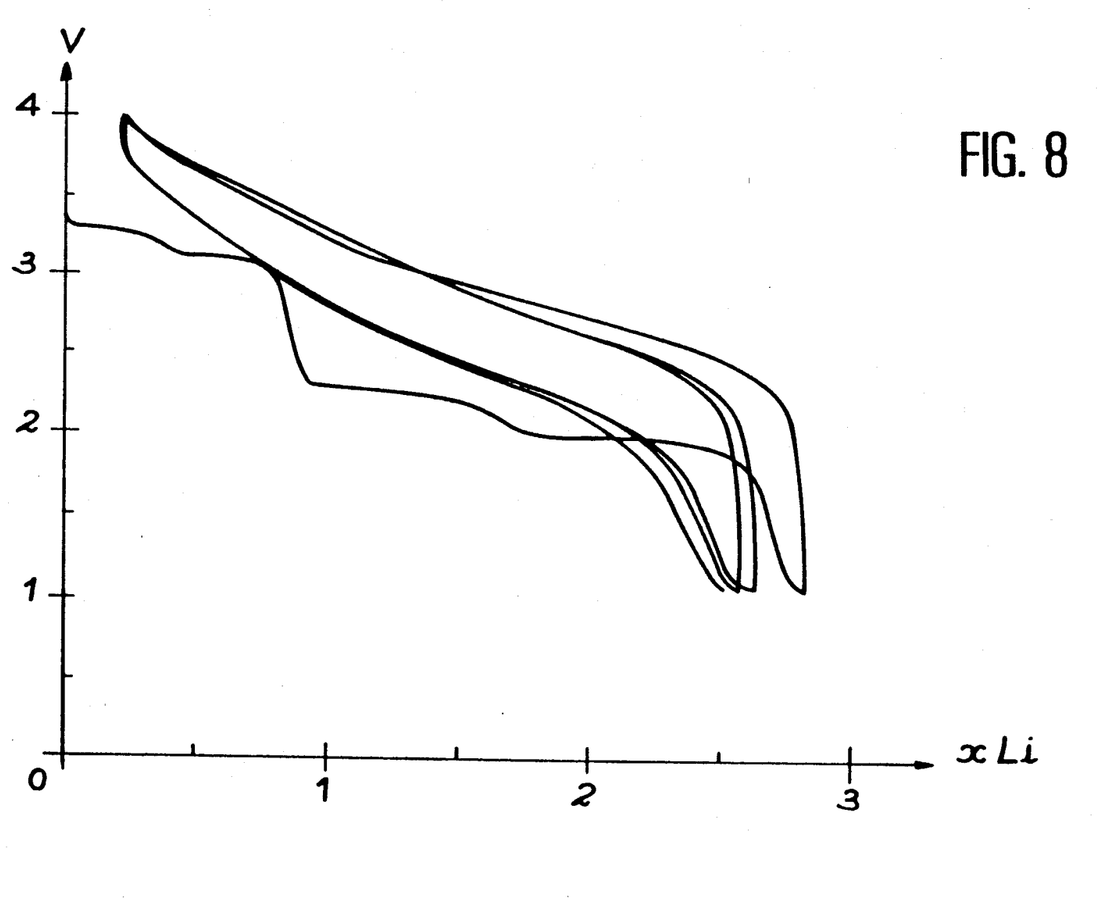
FIG. 8: A graph obtained during electrochemical cycling and the production of another electrode according to the invention, which shows the voltage (in volts) as a function of the number of intercalated lithium atoms (x).

FIG. 8 shows the voltage in volts as a function of the number of intercalated lithium atoms (x). The shape of the curve is identical to that of FIG. 2. The use of a such a wide potential range leads to a mass $V_2O_5$ energy of 900 Wh/kg for the material according to the invention. If the calculation of the mass energy takes place between the voltage limits 4 and 1.9 V (same lower limit as in example 1), 850 Wh/kg of $V_2O_5$ are obtained.

EXAMPLE 3

In this example the electrode material according to the invention is prepared chemically. In this case addition takes place of 500 mg of finely ground $V_2O_5$ to 50 ml of anhydrous hexane and then the $V_2O_5$ powder is kept suspended in hexane by stirring. This is followed by the dropwise addition to the suspension of 5.5 ml of a 1.6 mole/l n-butyl lithium solution in hexane. Stirring thereof is maintained for 5 days and then the powder is allowed to settle in this medium for 10 days. The powder is recovered by filtering on frit and then rinsed with hexane and dried in vacuo.

The X-ray diffraction spectrum of the thus obtained powder is the same as that shown in FIGS. 5 and 6. The material obtained incorporates 3 atoms of lithium and therefore corresponds to the formula $Li_3V_2O_5$.

This material is used as the positive electrode in the electrochemical generator of FIG. 1 and it is subject to electrochemical cycling by charging it with a constant current of 200 μA up to a potential of 3.4 V and then cycling it with the same current between 1.9 and 3.4 V.

Figure 9:
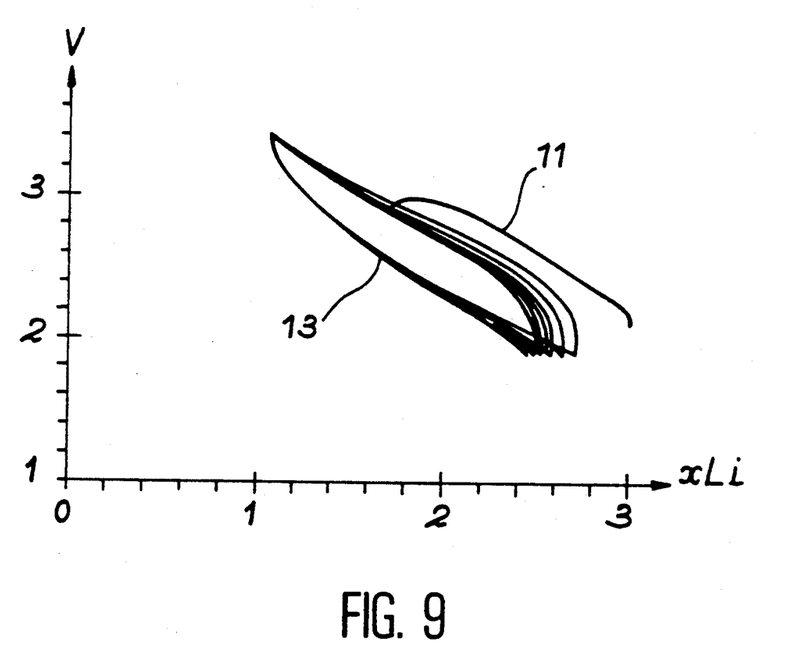
FIG. 9: The electrochemical cycling curve of a lithium generator using as the positive electrode the material according to the invention obtained chemically.

FIG. 9 shows the cycling curves obtained under these conditions, i.e. the voltage (in volts) as a function of the number of intercalated lithium atoms (x). Curve 11 corresponds to the first charging of the generator. After this, the cycling curves 13 have the same configuration as the curves of FIG. 2.

The electrochemical generator according to the invention using the electrode material according to the invention has numerous advantages. The mass energy of the novel material is higher than that of existing materials. Its mass capacity measured on cycling curves is generally, according to the cycling conditions, 400 to 900 Wh/kg of $M_zV_{2-z}O_{5-t}$ of the positive electrode, e.g. 550 Wh/kg of $V_2O_5$ in example 1 based on FIG. 2 and 916 Wh/kg of $V_2O_5$ in example 2 based on FIG. 8. The system reversibility is very good.

The intercalation or deintercalation kinetics are fast. It can be used in a very wide potential range, e.g. between 4 and 1 V, because the positive electrode is not sensitive to supercharging or superdischarging of the generator. The production costs are reduced, because the electrode material can be directly obtained from the $V_2O_5$ used as the precursor, which is an industrial product.

We claim:

1. An electrode material for an electrochemical generator, having the formula:

in which M represents Mo or Nb or both, and x, z and t are such that:

$0 < x \leq 3.2$, $0 \leq z < 1$, and $0 \leq t < 0.5$ and wherein said electrode material has an X-ray spectrum like that of FIG. 5 having two lines at an angular distance $2\theta$ of 64° and 44° for the wavelength $K\alpha_1$ of copper which correspond, respectively, to inner planar spacings of approximately 2.0 and 1.45 Å in the case where $z = t = 0$, these lines being substantially unchanged after charging and discharging of the electrode material.

2. The electrode material of claim 1, having an electrochemical cycling curve between 4 and 1 V, which has the configuration of the curves of FIGS. 2 and 8.

3. The electrode material of claim 1, wherein $z = 0$, and x is substantially equal to 3.

4. The electrode material of claim 1, wherein $t = 0$.

5. A process for the preparation of an electrode material according to claim 1, which comprises subjecting a $M_zV_{2-z}O_{5-t}$ material to a lithium intercalation by discharge of an electrochemical cell incorporating a positive electrode constituted by the material $M_zV_{2-z}O_{5-t}$, a lithium-based negative electrode and a lithium ion-conducting electrolyte, said discharge being carried out at up to a voltage below 1.9 V, based on the lithium electrode, under conditions such that at least 2.5 lithium atoms per mol of $M_zV_{2-z}O_{5-t}$ are intercalated.

6. The process of claim 5, wherein a minimum discharge voltage is between 1 and 1.9 V, based on the lithium electrode.

7. The process for preparing an electrode material according to claim 1, which comprises contacting a $M_zV_{2-z}O_{5-t}$ powder with an organolithium compound dissolved in an organic solvent, and stirring the same for a time such that at least 2.5 lithium atoms per mol of $M_zV_{2-z}O_{5-t}$ are inserted into the later.

8. The process of claim 7, wherein the organolithium compound is n-butyl lithium.

9. An electrochemical generator incorporating a vanadium oxide-based positive electrode, a lithium-based negative electrode and a lithium ion-conducting electrolyte, wherein the vanadium oxide of the positive electrode has the formula:

wherein M represents Mo or Mb or both, and x, z and t are such that:

$0 \leq x \leq 3.2,$ $0 \leq z \leq 1,$ and $0 \leq t \leq 0.5$ and has an X-ray diffraction spectrum like that of FIG. 5 for the particular case of $z=t=0$, having two lines with an angular distance to $\theta$ of 64° and 44° for the wavelength $K\alpha_1$ of copper, which, respectively, correspond to inner planar spacings of approximately 2.0 and 1.45 Å.

10. The generator of claim 9, which is recyclable between 4 and 1 V.

11. The generator according to claim 9, which has a recyclable mask capacity of 400 to 900 Wh/kg of $M_zV_{2-z}O_{5-t}$ of the positive electrode.

* * * * *

UNITED STATES PATENT AND TRADEMARK OFFICE
CERTIFICATE OF CORRECTION

PATENT NO. : 5,260,147
DATED : November 9, 1993
INVENTOR(S) : Claude Delmas, et al.

It is certified that error appears in the above-identified patent and that said Letters Patent is hereby corrected as shown below:

In the title page, item [54], line 1, "$LI_xM_{z2-z}O_{5-t}$," should read --$Li_xM_zV_{2-z}O_{5-t}$,--.

Column 8, line 15, "$Li_xM_zB_{2-z}O_{5-t}$" should read --$Li_xM_zV_{2-z}O_{5-t}$--.

Signed and Sealed this

Second Day of December, 1997

Attest:

Attesting Officer

BRUCE LEHMAN

Commissioner of Patents and Trademarks